(12) United States Patent
Eryurek et al.

(10) Patent No.: US 6,839,660 B2
(45) Date of Patent: Jan. 4, 2005

(54) ON-LINE ROTATING EQUIPMENT MONITORING DEVICE

(75) Inventors: Evren Eryurek, Minneapolis, MN (US); Kai Bouse, Tellico Plains, TN (US); Todd Reeves, Knoxville, TN (US)

(73) Assignee: CSI Technology, Inc., Knoxville, TN (US)

( * ) Notice: Subject to any disclaimer, the term of this patent is extended or adjusted under 35 U.S.C. 154(b) by 0 days.

(21) Appl. No.: 10/127,868

(22) Filed: Apr. 22, 2002

(65) Prior Publication Data

US 2003/0200060 A1 Oct. 23, 2003

(51) Int. Cl.$^7$ ................................................ G06F 3/14
(52) U.S. Cl. ......................... 702/188; 702/57; 702/65; 702/189
(58) Field of Search ............................ 702/33, 57, 65, 702/188, 189, 116, 130, 141, 163, 198; 382/105; 386/46; 700/11; 701/36

(56) References Cited

U.S. PATENT DOCUMENTS

| | | | | |
|---|---|---|---|---|
| 4,520,674 A | * | 6/1985 | Canada et al. ................. 73/660 |
| 5,262,732 A | | 11/1993 | Dickert et al. ............... 324/672 |
| 5,263,261 A | | 11/1993 | Piety et al. .................... 33/645 |
| 5,386,117 A | | 1/1995 | Piety et al. |
| 5,386,117 A | | 1/1995 | Piety et al. .................. 250/330 |
| 5,394,739 A | | 3/1995 | Garvey, III et al. ........ 73/54.23 |
| 5,506,501 A | | 4/1996 | Fogel et al. ................. 324/204 |
| 5,526,282 A | | 6/1996 | Nower et al. ................ 364/507 |
| 5,530,343 A | | 6/1996 | Bowers, III et al. ........ 324/173 |
| 5,544,073 A | | 8/1996 | Piety et al. .................. 364/508 |
| 5,604,441 A | | 2/1997 | Freese, V et al. ........... 324/663 |
| 5,614,830 A | | 3/1997 | Dickert et al. .............. 324/553 |
| 5,621,655 A | | 4/1997 | Nower et al. ................ 364/506 |
| 5,633,811 A | | 5/1997 | Canada et al. .............. 364/576 |
| 5,637,871 A | | 6/1997 | Piety et al. .................. 250/330 |
| 5,646,350 A | | 7/1997 | Robinson et al. ............. 73/602 |
| 5,656,767 A | | 8/1997 | Garvey, III et al. ........ 73/61.44 |
| 5,674,401 A | | 10/1997 | Dickert et al. .............. 210/695 |
| 5,680,025 A | | 10/1997 | Bowers, III et al. ........ 318/806 |
| 5,684,578 A | | 11/1997 | Nower et al. ............. 356/141.3 |
| 5,691,924 A | | 11/1997 | Czyzewski et al. ......... 364/576 |
| 5,715,609 A | | 2/1998 | Nower ........................ 33/645 |
| 5,726,911 A | | 3/1998 | Canada et al. .............. 364/550 |
| 5,739,698 A | | 4/1998 | Bowers et al. .............. 324/772 |
| 5,744,723 A | | 4/1998 | Piety ........................... 73/660 |

(List continued on next page.)

FOREIGN PATENT DOCUMENTS

| | | |
|---|---|---|
| AU | 2634192 A1 | 6/1993 |
| CA | 2081228 | 11/1991 |
| GB | 547015 | 8/1942 |
| GB | 2 323 665 A | 9/1998 |
| GB | 2 324 877 A | 11/1998 |
| GB | 2 337 117 A | 11/1999 |
| GB | 2 339 284 A | 1/2000 |

*Primary Examiner*—Hal Wachsman
*Assistant Examiner*—Felix Suarez
(74) *Attorney, Agent, or Firm*—Luedeka, Neely & Graham, P.C.

(57) ABSTRACT

A rotating equipment monitoring device includes a set of sensors, such as temperature, speed, pressure, and vibration sensors, locally connected to a diagnostic unit having a plant communication interface and a processor that implements one or more diagnostic routines. The diagnostic unit collects data from the sensors and performs diagnostics thereon to detect actual or potential problems with the rotating equipment on a continuous or semi-continuous basis. Using the communication interface, the diagnostic unit automatically sends signals indicating detected conditions of the rotating equipment to a maintenance system or a control system via standard or common communication network, such as a HART or Fieldbus network. The diagnostic unit may also be intermittently coupled to an off-line computer, such a one associated with a service provider, who may verify or further define the diagnostics provided by the diagnostic unit.

39 Claims, 2 Drawing Sheets

U.S. PATENT DOCUMENTS

| | | | |
|---|---|---|---|
| 5,817,928 A | 10/1998 | Garvey, III et al. | 73/53.05 |
| 5,841,255 A | 11/1998 | Canada et al. | 318/490 |
| 5,852,351 A | 12/1998 | Canada et al. | 318/490 |
| 5,854,994 A | 12/1998 | Canada et al. | 702/56 |
| 5,870,699 A | 2/1999 | Canada et al. | 702/190 |
| 5,875,420 A | 2/1999 | Piety et al. | 702/182 |
| 5,895,857 A | 4/1999 | Robinson et al. | 73/660 |
| 5,907,491 A | 5/1999 | Canada et al. | 364/468.15 |
| 5,922,963 A | 7/1999 | Piety et al. | 73/659 |
| 5,943,634 A | 8/1999 | Piety et al. | 702/56 |
| 5,952,803 A | 9/1999 | Canada et al. | 318/558 |
| 5,960,214 A | 9/1999 | Sharpe, Jr. et al. | 395/835 |
| 5,965,819 A | 10/1999 | Piety et al. | 73/660 |
| 5,980,094 A | 11/1999 | Nower | 364/528.14 |
| 6,017,143 A | 1/2000 | Eryurek et al. | 364/148.06 |
| 6,024,521 A | 2/2000 | Swaggerty | 409/131 |
| 6,041,287 A * | 3/2000 | Dister et al. | 702/182 |
| 6,064,480 A | 5/2000 | Mountain et al. | 356/335 |
| D427,097 S | 6/2000 | Garvey, III et al. | D10/104 |
| 6,078,874 A | 6/2000 | Piety et al. | 702/122 |
| 6,084,195 A | 7/2000 | Swaggerty et al. | 219/86.41 |
| 6,087,796 A | 7/2000 | Canada et al. | 318/565 |
| 6,091,236 A | 7/2000 | Piety et al. | 324/103 P |
| 6,124,692 A | 9/2000 | Canada et al. | 318/490 |
| 6,138,078 A | 10/2000 | Canada et al. | 702/44 |
| 6,189,384 B1 | 2/2001 | Piety et al. | 73/592 |
| 6,192,325 B1 | 2/2001 | Piety et al. | 702/184 |
| 6,199,018 B1 | 3/2001 | Quist et al. | 702/34 |
| 6,216,539 B1 | 4/2001 | Johnson et al. | 73/592 |
| 6,220,098 B1 | 4/2001 | Johnson et al. | 73/592 |
| 6,234,021 B1 | 5/2001 | Piety et al. | 73/592 |
| 6,247,353 B1 | 6/2001 | Battenberg et al. | 73/40.5 A |
| 6,297,742 B1 | 10/2001 | Canada et al. | 340/635 |
| 6,301,514 B1 | 10/2001 | Canada et al. | 700/108 |
| 6,330,525 B1 * | 12/2001 | Hays et al. | 702/183 |
| 6,368,068 B1 * | 4/2002 | Corlew et al. | 417/120 |
| 6,370,448 B1 | 4/2002 | Eryurek | 700/282 |

\* cited by examiner

ON-LINE ROTATING EQUIPMENT MONITORING DEVICE

FIELD OF THE TECHNOLOGY

The present invention relates generally to process plant monitoring devices and, more particularly, to a device that performs on-line monitoring for rotating equipment within a process plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices via the communication busses, uses this information to implement a control routine and then generates control signals which are sent over the one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

Many process plants, and especially those that use smart field devices (which are field devices having on-board microprocessors), include applications used to help monitor and maintain many of the devices within the plant. For example, the Asset Management Solutions (AMS) application sold by Fisher-Rosemount Systems, Inc. enables communication with and stores data pertaining to field devices to ascertain and track the operating state of the field devices. This activity is typically called condition monitoring. An example of such a system is disclosed in U.S. Pat. No. 5,960,214 entitled "Integrated Communication Network for use in a Field Device Management System." In some instances, the AMS application may be used to communicate with devices to change parameters within the device, to cause the device to run applications on itself, such as self calibration routines or self diagnostic routines, to obtain information about the status or health of the device, etc. This information may be stored and used by a maintenance person to monitor and maintain these devices. This product is especially capable when it can connect to and acquire data from the smart field devices via a fixed communication network, such as one associated with the HART or FOUNDATION Fieldbus protocol. However, local or portable handheld interface devices may be used, in many cases, to acquire or collect data pertaining to field devices or other devices within the plant and this data may then be uploaded to the maintenance software for processing or viewing.

While a typical process control system has many process control and instrumentation devices, such as valves, transmitters, sensors, etc., connected to one or more process controllers and maintenance computers, there are many other supporting devices which are related to and necessary for the process operation. These additional devices include, for example, power supply equipment, power generation and distribution equipment, and other rotating equipment such as turbines, pumps, etc., located at numerous places in a typical process plant. While this additional equipment does not necessarily create or use process variables and, in most instances, is not controlled or even coupled to a process controller for the purpose of affecting the process operation, this equipment is nevertheless important to and ultimately necessary for proper operation of the process. However, because monitoring of this equipment is not typically needed for process control, this equipment, if monitored at all, is generally monitored very infrequently, such as on a monthly basis, and only for maintenance purposes.

In particular, while a plant will sometimes be set up to perform regular condition monitoring on the most critical rotating equipment, such as turbines, compressors and critical pumps, most of the rotating equipment within the plant (called "balance of plant" equipment) is not monitored on an on-going basis. When permanent condition monitoring is performed on equipment, the condition monitoring system typically includes a set of sensors mounted on the equipment, with the sensors being configured to provide data to a local buffer device. This buffer device stores the data and, periodically, downloads the data to an off-line computer system that then processes the data to detect current or future problems, error conditions, etc. using a variety of different diagnostic applications. The off-line computer system is typically associated with or provided by a specialized service provider who may collect the data from the buffer device using, for example, a hand-held (e.g., a local) communication device or a fixed communication link, such as the internet. Once collected, the data is processed using typically proprietary software and a report is generated and sent to the plant maintenance personnel indicating actual or potential problems with the equipment.

Other less important mechanical equipment is typically monitored on a less frequent basis, such as once a month. In these cases, a service provider comes to the plant, temporarily attaches appropriate measurement devices, such as temperature, pressure, speed and vibration sensors, to the rotating equipment, collects data from the sensors during operation of the equipment and then takes the data back to the service site to run diagnostics on that data. Thereafter, a diagnostic report is generated and sent to the plant personnel electronically and/or in paper format.

Unfortunately, in both of these instances, there may be a significant time lag between the times at which the rotating equipment data is collected and, additionally, there may be a further time lag between the time when the data is collected and when a diagnostic report is received at the plant. As a result, there are significant periods of times during which problems with the rotating equipment may go undetected, enabling a problem to get out of hand, cause serious damage to the equipment or cause poor performance in the plant. Also, because the data collection is periodic, intermittent problems may go unnoticed simply because the problem is not occurring at the time the data is being collected. Moreover, this data collection procedure is labor intensive and can be very expensive, in spite of the fact that, with the higher demands on production and needs for optimization, monitoring and controlling this rotating equipment have become a higher priority in today's advanced platforms.

SUMMARY

A rotating equipment monitoring device includes a set of sensors, such as temperature, speed, pressure, and vibration sensors, locally connected to a diagnostic unit having a plant communication interface and a processor that implements one or more diagnostic routines. The diagnostic unit collects data from the sensors and performs diagnostics thereon to detect actual or potential problems with the device on a continuous or semi-continuous basis. Using the communication interface, the diagnostic unit automatically sends signals indicating problems or other messages about the rotating equipment to a maintenance system or a control system via standard or common communication network, such as a HART or Fieldbus network. The diagnostic unit may also be intermittently coupled to an off-line computer, such a one associated with a service provider who may verify or further define the diagnostics provided by the diagnostic unit.

This rotating equipment monitoring device provides the advantage of operating on-line, in a dedicated manner to collect and process data for a particular piece of rotating equipment within the plant and to provide immediate indications of the current or future operating state of that equipment to plant personnel via plant communication infrastructure. Because the monitoring device is connected to and capable of performing diagnostics for the piece of rotating equipment at any time, the monitoring device is capable of detecting intermittent problems and of quickly recognizing a problem that may need immediate attention or that may be responsible for poor plant performance. Because the monitoring device may be connected to and communicate via common communication protocols, such as the HART or Fieldbus protocol, the monitoring device is easy to install and maintain.

DETAILED DESCRIPTION

Figure 1:
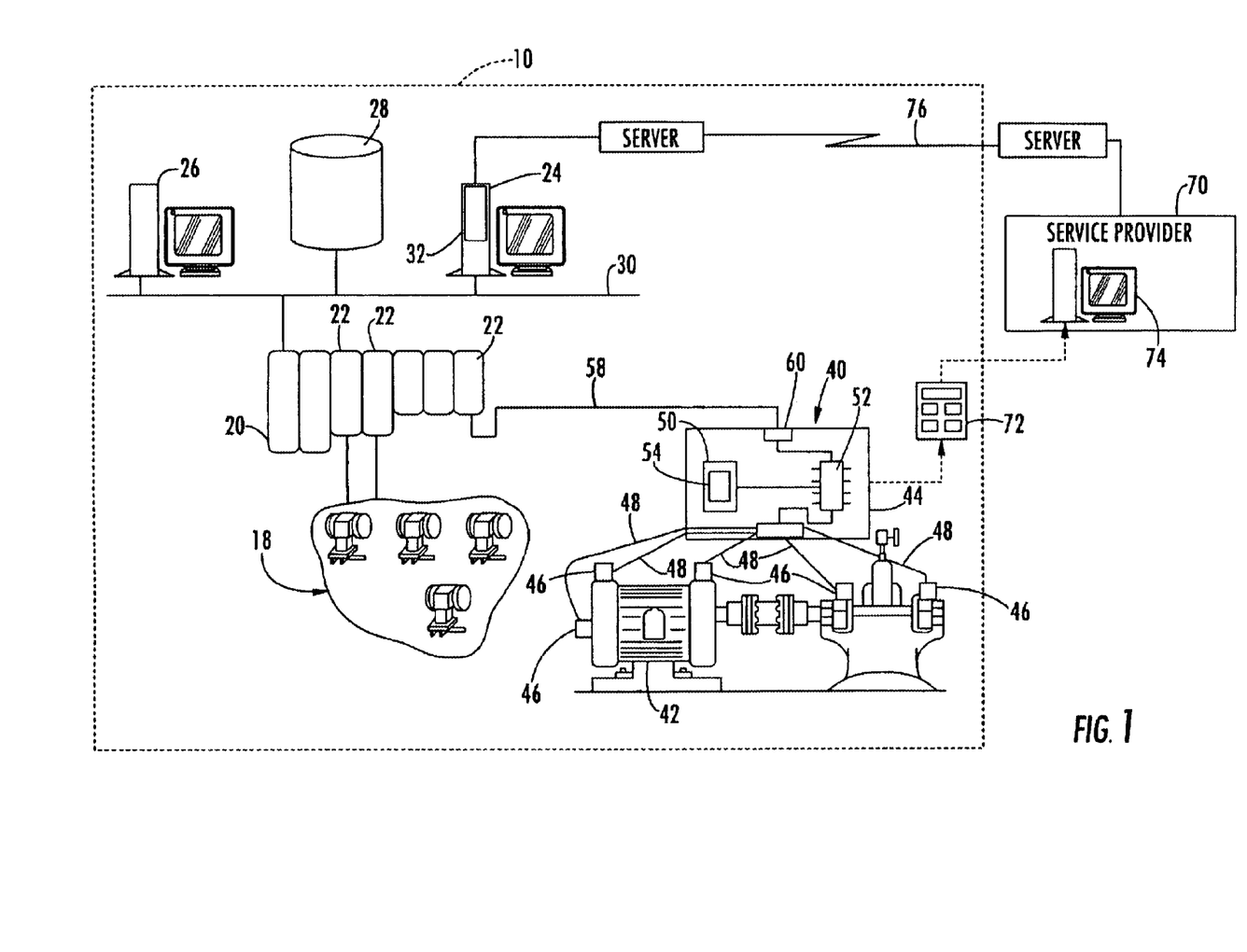
FIG. 1 is a schematic block diagram of a rotating equipment monitoring device which is coupled to a turbine and which is in communication with a process plant and a service provider site.

Referring now to FIG. 1, a process plant 10 includes numerous field devices 18 connected to a distributed control system (DCS) controller 20 via one or more input/output devices 22. The DCS controller 20 is connected to one or more host computers 24 and 26 and to a data historian 28 via a bus 30 which may be, for example, an Ethernet bus. As is known, the DCS controller 20 performs any desired type of control within the plant 10 by sending signals to and receiving signals from the field devices 18 and processing such signals using any known or standard control software. The DCS controller 20 may report status information to one or more applications within, for example, the host computer 24 regarding the operating state of the process and/or the operating state of the field devices 18. If desired, one of the applications 32 within the host computer 24 may be a maintenance application, such as the AMS application described above, which tracks the operating state of different devices within the process plant 10. Of course, other applications (depicted generally by the application 32) within the host computers 24 and 26 may include optimization applications, control applications, performance monitoring applications, display applications such as error or alarm applications that display indications of device conditions to plant personnel, etc. Of course, these applications may display any desired information to an operator or to a maintenance person within the plant 10 via display devices associated with the host computers 24 or 26. The control system illustrated in FIG. 1 is merely exemplary in nature and other types or configurations of control systems can be used as well.

As illustrated in FIG. 1, a rotating equipment monitoring device 40 is mounted on or near a piece of rotating equipment 42 within the plant 10. While illustrated as being mounted on a turbine, the rotating equipment monitoring device 40 may be mounted on or near other types of rotating equipment, such as pumps, fans, gear boxes, motors, compressors, etc. The rotating equipment monitoring device 40 includes a diagnostic unit 44 connected to numerous sensors 46 via, for example, communication lines 48. If desired, however, the diagnostic unit 44 may be connected to communicate with the sensors 46 in a wireless manner using standard wireless transmitters and receivers. The sensors 46 may be any desired types of sensors typically or advantageously used to perform condition monitoring on rotating equipment, such as vibration sensors or transducers (including, for example, accelerometers, velocity sensors, and proximity or displacement sensors), pressure sensors, temperature sensors (like thermocouples or resistive temperature detector (RTD) devices), speed sensors, flux sensors, current sensors, etc. Of course, other types of sensors may be used as well, such as laser detectors, etc. While not necessary, it is generally desirable to have at least one speed sensor, at least one temperature sensor and multiple vibration sensors permanently mounted at appropriate locations on or near the rotating equipment 42 to be able to perform diagnostics on the rotating equipment 42. In any event, the specific types and numbers of sensors used within the rotating equipment monitoring device 40 and the placement of those sensors on the rotating equipment 42 will vary depending on the type of rotating equipment being monitored and on the level or types of diagnostics being performed.

The diagnostic unit 44 includes a memory 50 and a processor 52, which may be a microprocessor or microcontroller, an ASIC or other processing device that is configured or programmed to collect the data generated by the sensors 46 and to perform diagnostics on that data to detect current or future (expected) conditions within the rotating equipment 42 based on the collected data. The detected conditions may include, for example, misalignment of the rotating equipment, low oil, rise in temperature, too many motor starts or stops, clogged vents, etc. Of course, these are only some of the possible conditions that can be detected and other conditions may be detected in any known or desired manner. The diagnostic unit 44 may store and implement any desired diagnostic routine(s) 54 in the memory 50 to detect the conditions, with these routines differing generally based on the type of rotating equipment being monitored and the level or accuracy of diagnostics desired. In general, the more sensors 46 that are coupled to the diagnostic unit 44, the better the diagnostic unit 44 will be able to detect conditions and the more conditions that will be detectable. Furthermore, the diagnostic unit 44 may be able to store and implement different diagnostic routines of different capability depending on the use to which the monitoring device 40 is put.

In any event, the diagnostic unit 44, which is preferably permanently mounted near to or on the rotating equipment 42, is connected to the DCS controller 20 via a plant communication network 58 and an input/output device 22 associated with the DCS controller 20. The plant communication network 58 may be, for example, a 2-wire communication network like a 4–20 milliamp network, a HART network, a FOUNDATION Fieldbus network or any other desired type of communication network. This network could instead be a 3-wire or a 4-wire network if so desired. While the communication network 58 is illustrated in FIG. 1 as a hardwired network, it could also be a wireless network using any appropriate type of wireless communication devices.

To communicate via the network 58, the diagnostic unit 44 includes any known or desired communication interface 60, which may be, for example, a software interface (executed on the microprocessor 52), a combined software and hardware interface or a firmware interface, appropriate for the communication network 58, with the communication interface 60 being capable of sending signals or messages via the network 58 to the DCS 20 as illustrated in FIG. 1. If desired, however, the diagnostic unit 44 could be connected to other computers within the plant 10, such as the host computers 24 and 26, via the same or other plant based communication networks.

During operation of the plant 10, the sensors 46 (which are preferably permanently mounted on the rotating equipment 42) send signals to the diagnostic unit 44 which then processes the received signals in any desired manner to produce indications of one or more conditions associated with the rotating equipment 42. The diagnostic unit 44 may store the received data as well as processed data or the condition indications in the memory 50. During operation, the processor 52 may execute the diagnostic routine(s) 54 using the collected data to detect actual or potential (e.g., expected) conditions associated with the rotating equipment 42. These conditions may include actual or expected problems as well as other conditions, such as conditions that indicate the health, status, amount of use and variability of the rotating equipment 42. As noted above, the detected conditions may include, for example, misalignment of the rotating equipment, low oil, rise in temperature, number of motor starts or stops, hours of use, number of rotations, clogged vents, etc. Generally, the type of conditions can be different, as would be appropriate, for different types of rotating equipment and would be different depending on the nature of the diagnostic routine(s) 54 being used. As an example, however, the diagnostic or condition monitoring routines 54 implemented by the processor 52 may implement some or all of the procedures described in U.S. Pat. Nos. 5,263,261; 5,526,282; 5,684,578; 5,980,094; 5,854,994; 5,907,491; 5,530,343; 5,680,025; 5,726,911; 5,739,698; 6,087,796; 5,262,732; 6,234,021; 5,646,350; 5,691,924; 5,744,723; 5,875,420; 5,895,857; 5,922,963; 5,943,634; 6,370,448; and 6,017,143 which are hereby expressly incorporated by reference herein. If necessary, the diagnostic routine(s) 54 may send requests for (or be configured to automatically receive) information from the DCS controller 20, one or more of the host computers 24 or 26, the data historian 28, or other devices within the plant 10 such as one or more of the field devices 18, and may use this data as well to perform diagnostics on the rotating equipment 42.

In any event, after performing any desired level of diagnostics, the diagnostic unit 44 may send an indication of a detected condition to the DCS controller 20 or to one or more of the host computers 24 and 26 to alert plant personnel of the problem or condition. In this manner, the diagnostic unit 44 can monitor the condition of the rotating equipment 42 and, upon detecting a problem, error, alert or other condition, can immediately notify a plant operator or maintenance personnel, the controller software or other applications, such as optimization applications, of the detected condition. This operation eliminates the lag in time that it typically takes to alert plant operators or maintenance personnel or other applications within the plant of negative conditions within the rotating equipment. Of course, the recipients of the data can use that data in any desired manner, such as to alter the use of the plant equipment relying on the rotating equipment 42, to perform or schedule maintenance for the rotating equipment 42, to order parts for the rotating equipment 42, to change the control routine to optimize plant performance in the presence of the condition, etc.

Still further, if desired, the raw data collected by the sensors 46, the indications of the detected conditions determined by the diagnostics unit 44 or any other data within the diagnostics unit 44 may be sent to a service provider site 70 using any desired technique. For example, that data may be periodically downloaded to a handheld (local) interface device 72 (which can be connected to the diagnostic unit 44 via a local communication interface within the interface 60 using any desired type of interface protocol) and delivered to the site 70 for processing. Alternatively or in addition, this data may be periodically transmitted via, for example, an internet or other public communication network connected to the service provide site 70. When the data has been delivered to the service provider site 70, a service provider may process this data on, for example, a service provider computer 74 to verify the diagnostics performed by the diagnostic unit 44. Alternatively or in addition, the computer 74 may perform other or more complete diagnostics to further identify a detected condition and to suggest a solution or a root cause of the problem. Of course, the computer 74 may use any known or desired software or processing routines to perform diagnostics on the collected data. After performing diagnostics, the service provider computer 74 may send a verification or other information regarding the detected condition to one of the host computers 24 within the plant 10 via, for example, an internet communication link 76. Of course, the service provider computer 74 may communicate with the plant 10 in any other desired or typical manner, such as via a written report.

In any event, the service provider at the service provider site 70 can periodically verify or expand upon the conditions detected by the diagnostic unit 44 to provide the plant personnel more information or more confidence with respect to the condition of the rotating equipment 42 as detected by the monitoring device 40. While, as before, the service provider, will typically be able to perform its analysis only periodically, the diagnostic unit 44 is capable of providing an on-line, immediate and constantly updated indication of the general condition of the rotating equipment 42 and can be used to provide to the plant personnel at least a rough indication of operating conditions of the rotating equipment 42 that might lead to an eventual machine defect. This indication can increase machine life by not allowing root causes to run uncorrected (such as pump cavitation under certain process loads). The diagnostic unit 44 is also able to detect intermittent "bump in the night" problems and serious problems that may occur very quickly, such as detecting the sudden loss of lubrication due to a burst seal or water contamination washing out the lubrication. Of course, this detection may be inferred from various sensor data if it cannot be measured directly. The diagnostic unit 44 is also able to indicate that the rotating equipment 42 needs to be maintained based on actual measurements, instead of using a time-between maintenance analysis. For example, the diagnostic unit 44 may provide an indication that the rotating equipment 42 needs to be lubricated based on actually measured or estimated (based on various sensor data) lubrication conditions instead of using a time-based schedule. Further, the diagnostic unit 44, because it is operating on-line, may detect clogged motor vents (based on temperature rise, for example), may detect axial misalignment (using a laser sensor, for example, or based on the processing of other sensor data), may document the actual number of motor starts and generate an alarm on too many starts as well as a host of other activities. Of course, the diagnostic unit 44 may perform any other condition monitoring or diagnostics using data from the sensors 46.

While there are many different types of rotating equipment, most rotating equipment has a set of common features which can be exploited to enable the same monitoring device 40 to be able to be used on different types of rotating equipment. In particular, it is desirable to produce the rotating equipment monitoring device 40 using a generally applicable platform that can be programmed differently depending on the use and level and types of diagnostics desired. Thus, it is generally beneficial to use a programmable processor within the diagnostic unit 44 which can be programmed with different diagnostic software depending on the type of rotating equipment for which the monitoring device 40 is to be put. Further, it is generally desirable to provide the monitoring device 40 with a certain minimum number of channels and of allowing the diagnostic unit 44 to be scalable in the number of sensors it supports. These features will make the monitoring device 40 more applicable to different types of rotating equipment. For example, pumps, fans, compressors, etc. may all require a monitoring device with approximately four or six vibration channels (sensors). Other groups of equipment that have similar monitoring requirements and provide the ability to monitor minimally or optimally according to customer preference and budget constraints.

The diagnostic routine(s) 54 may provide an indication of the health, use or variability of the equipment and may send signals regarding those conditions to the operator, maintenance person, DCS controller, optimizer routine, or other routines. If desired, the diagnostic unit 44 may be configured to provide power to the sensors 46 in any manner, and may be configured to obtain power from the 2-wire, 3-wire or 4-wire network or other common digital communication network to which it is connected. Preferably, although not necessarily, the monitoring device 40 is field installable, may provide a health index of the device being monitored and can be integrated with a DCS controller using any desired protocol, such as the 4–20 mA, HART™ and FOUNDATION Fieldbus™ protocols (or any other Fieldbus protocol such as the Profibus and CAN protocols), a TCP/IP protocol, etc. As a result, the information within the diagnostics unit 44 is preferably accessible and viewable using a browser from the host computer 24 in the same manner as field devices, such as Fieldbus field devices are browsable. This browser may include, for example, the Internet Explorer, Netscape, etc. browsers or browsers associated with host applications, such as the browsers within the AMS application which provides an embedded HTML server core. The diagnostic unit 44 is also preferably able to be integrated with asset management systems, such as RBMware (sold by CSI Technology, Inc.), the AMS system described above, any desired or appropriate CMMS packages. Also, the monitoring device 40 may have a scalable or variable number of sensors (such that the diagnostic unit 44 is configured to receive and has ports for up to any desired number of sensors) and so can be upgraded over time wherein, typically, the higher the number of sensors, the more capability the monitoring device 40 includes. Of course, the software or diagnostic routines 54 within the device 40 may be changed or upgraded as well. Still further, the sensors 46 may be removably connected to the diagnostic unit 44 using any desired or appropriate coupling technology.

Figure 2:
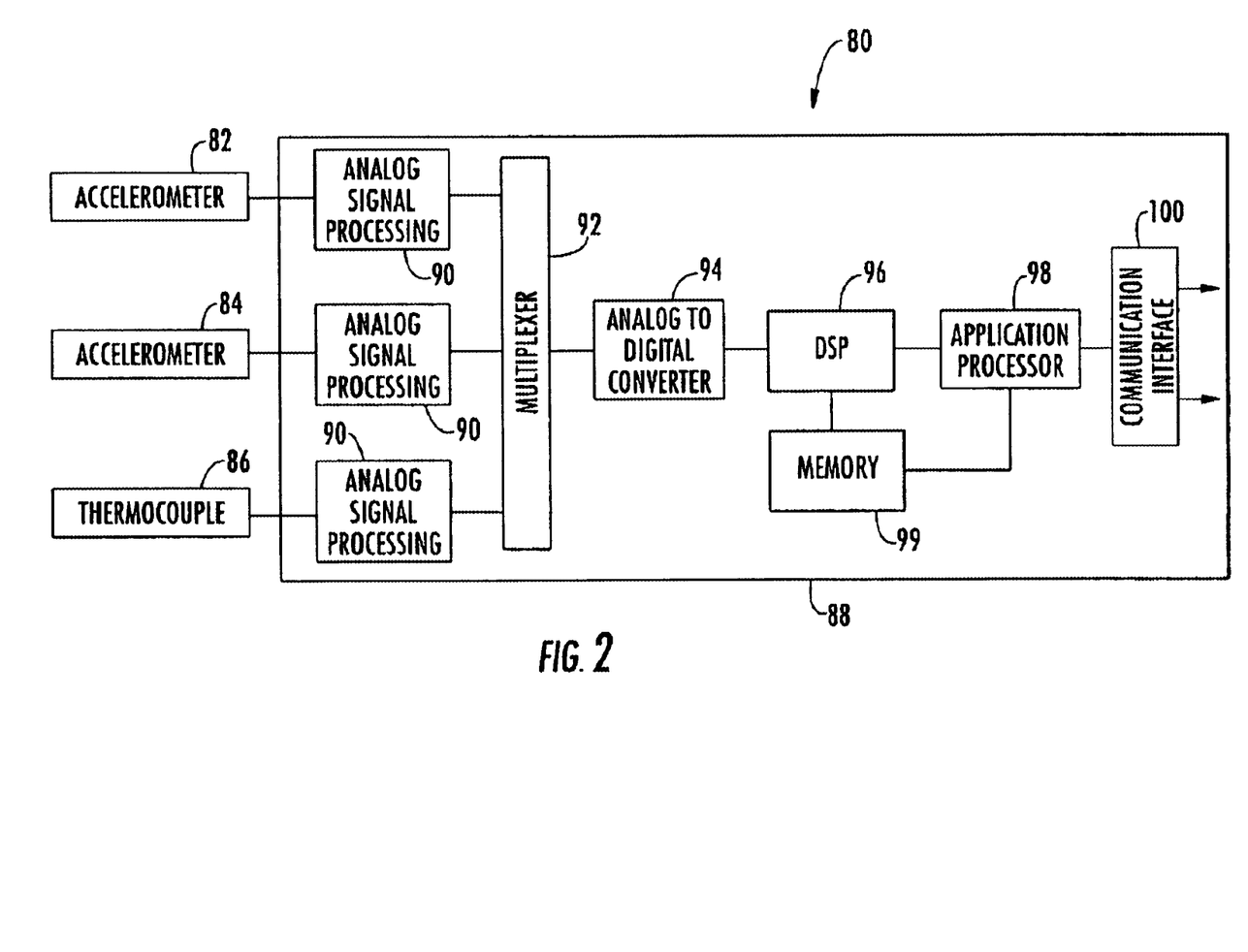
FIG. 2 is a block diagram of a rotating equipment monitoring device, such as the one of FIG. 1, having three channels.

Referring now to FIG. 2, a block diagram of a three channel rotating equipment monitoring device 80 is illustrated as including three analog sensors, namely two accelerometers 82 and 84 and a thermocouple 86, communicatively coupled to a diagnostic unit 88. Of course other types of sensors, such as digital sensors, and additional sensors may be used as well. The diagnostic unit 88 includes analog signal processing circuitry 90 which processes the signals from each of the sensors to, for example, filter and decode the analog signals. A multiplexer 92 then provides the processed analog signals, one at a time, to an analog-to-digital converter 94 which provides a digital signal to a digital signal processor 96. The digital signal processor 96 performs digital signal processing, such as filtering, Fourier transforming, etc. on the digital signals and provides the digital signals and/or the processed signals to an application processor 98 and, if desired, to a memory 99 for storage. The application processor 98 may perform diagnostic routines such as the diagnostic routines 54 discussed above with respect to FIG. 1. Of course, the application processor 98 may implement any desired processing using the signals received from the digital signal processor 98 or stored in the memory 99, and any other signals, such as signals received from a controller or host device (not shown in FIG. 2). In any event, the application processor 98 detects conditions or problems based on the received and stored signals and produces indications of these conditions, for example, in the form of signals or messages to be sent to the plant personnel or other applications within the plant 10.

The application processor 98 provides the signals to a communication interface 100 which may be any desired or type of interface. The interface 100 packages or reformats the signals and sends them to a DCS controller, a host computer, a historian database, etc. via a communication network, such as a HART or Fieldbus communication network (which may be, for example, the FOUNDATION Fieldbus protocol network, the Profibus protocol network, the CAN protocol network, etc.), a TCP/IP network or any other desired communication network. Of course, the interface 100 may be configured in the same manner as the communication interfaces of field devices 18 or other devices in the plant 10 so that the monitoring device 80 appears to the plant 10 as the other devices, which can be accessed, communicated with, detected, browsed, etc.

If desired, the monitoring devices 40 and 80 may configured to perform according to any desired level of processing functionality. For example, the processing frequency and number of channels (sensors) for the monitoring device should be the highest needed by equipment in the class of devices that the monitoring device 40 or 80 will be used to monitor. The monitoring device 40 or 80 may be configured to provide, for example, a 0–70 Hz processing frequency with 5 channels; a 0–70 Hz processing frequency with 10 channels; a 0–150 Hz processing frequency with 5 channels and; a 0–150 Hz processing frequency with 10 channels, etc. Of course, other ranges and sensor numbers may be used as well. Still further, if desired, each monitoring device 40 or 80 may include one speed input for order-based analysis and order tracking, one digital input for use in scheduling, one digital output for alarm enunciation (possibly two in the 10-channel configuration), one analog input for an additional variable; e.g., temperature or load (possibly both) and one analog output (4–20 ma) for a 0–100% health condition indication. Of course, other channels and inputs and outputs could be provided as well, such as channels used for flux monitoring.

Also preferably, the diagnostic unit 44 or 88 will support 100, 200, 400, 800, 1600, 3200 or 6400 line collections at a set of bandwidths predefined to meet the needs of the type of rotating equipment to be monitored. This could be in the range of 100 orders maximum with easily computed intervals (e.g., 8.75 Hz, 70 Hz, 875 Hz, 7 KHz; 18.75 Hz, 150 Hz, 1.875 KHz, 15 KHz). Tachometer pulse marking of the waveform, order-tracking and synchronous averaging may all be supported by the diagnostic unit 44 or 88. It is not necessary to provide dynamic auto-ranging during acquisition of sensor signals. Rather, if desired, the diagnostic unit 44 or 88 may implement a method for periodically performing an auto-range function and then using the results until further notice. The monitoring device 40 or 80 may also store and schedule self-test and calibration functions on a regular basis as defined by a personality module that may be integrated therein.

Still further, the monitoring device 40 or 80 may provide support for peak analysis processing. The monitoring device 40 or 80 may include, for example, an analog peak following circuit that can be switched into the signal path to allow use of the default acquisition frequencies. Still further, a set of selectable bandpass and highpass filters (such as two each) tailored to the default acquisition ranges for the type of rotating equipment to be monitored may be used to provide further processing. During this analysis, the monitoring device 40 or 80 may collect and determine typical scalar values, such as RMS, peak, peak-to-peak and DC bias on the vibration channels or the other analog input channels. The monitoring device 40 or 80 may determine the state of the digital input(s) and may determine the current speed as measured on the tachometer channel.

Of course, the monitoring device 40 or 80 may determine other values using any traditional parameter, waveform or spectra analysis and using any set of appropriate equations. In this regard, the diagnostic unit 44 or 88 may use spectral analysis, statistical analysis, wavelet analysis, fractal analysis, artificial intelligence, expert engines, such as simple if-then rule base expert systems, fuzzy logic systems, neural network systems, etc., or any other type of analysis to determine conditions of the rotating equipment 42. Likewise, the monitoring device 40 or 80 may have its own decision making capabilities based on the information it gathers on a particular rotating equipment. Typically, the more information that is available, the more diagnostic capabilities the diagnostic unit 44 or 88 will have.

While the rotating equipment monitoring devices 40 and 80 have been described herein for use with a turbine, they could also be used to perform condition monitoring for any other types of rotating equipment, such as machine tools, cutters, rollers, robots, conveyors, miners, cranes, etc. that have a movement and/or vibration aspect which can be analyzed to determine a health or other condition of the rotating equipment. Also, the diagnostic unit 44 or 88 is preferably configured to operate substantially continuously during operation of the rotating equipment to detect conditions associated with the rotating equipment, that is to operate continuously or on a periodic time frame with a small interval, e.g., once every minute or couple of minutes.

Also the diagnostic unit 44 or 88 may be configured to send the condition indications automatically upon generating them, automatically in a periodic manner or when polled by another computer, such as one of the host computers 24 and 26.

While the rotating equipment monitoring devices 40 and 80 have been described as preferably performing processing and diagnostics using software, they may use hardware, firmware, etc. using any type of processor, such as an ASIC, etc. In any event, the recitation of a routine stored in a memory and executed on a processor includes hardware and firmware devices as well as software devices. For example, the elements described herein may be implemented in a standard multipurpose CPU or on specifically designed hardware or firmware such as an application-specific integrated circuit (ASIC) or other hard-wired devices as desired and still be a routine executed in a processor. When implemented in software, the software routine may be stored in any computer readable memory such as on a magnetic disk, a laser disk, an optical disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A rotating equipment monitoring system for use in a process plant having rotational equipment comprising:
    a communication network;
    a plurality of sensors adapted to be mounted on or near the rotating equipment to measure parameters associated with the rotating equipment during operation of the rotating equipment and to produce data indicative of the measured parameters; and
    a diagnostic unit communicatively coupled to receive the data from each of the plurality of sensors, the diagnostic unit including;
        a processor;
        a memory;
        a diagnostic routine stored in the memory and adapted to be executed on the processor to perform diagnostics using the data collected from the plurality of sensors to produce a first condition indication indicating a condition of the rotating equipment; and
        a communication interface adapted to be coupled to the communication network to send the first condition indication and the data over the communication network;
    a host computer connected to the communication network and receiving at least the first condition indication and responding to the first condition indication to produce commands for controlling the operation of the rotating equipment;
    a service provider computer connected to the communication network for receiving the data, for processing the data to determine the condition of the rotating equipment to produce a second condition indication, and for communicating the second condition indication to the host computer; and the host computer receiving the second condition indication from the communication network and being responsive thereto to selectively produce commands for controlling the operation of the rotating equipment.

2. The system of claim 1 wherein the communication network comprises a control system connected to a local area network connected to a global computer network.

3. The system of claim 1 wherein:

the service provider computer receives the first condition indication and the data, processes the data to determine the condition of the rotating equipment to produce a second condition indication, generates a verify signal to verify the accuracy of the first condition indication based on the second condition indication, and communicates the verification signal and the second condition indication to the communication network, and the host computer receives the verify signal and the second condition indication from the communication network and is responsive thereto to selectively produce commands for controlling the operation of the rotating equipment.

4. The system of claim 1 wherein the service provider computer receives at least the data and produces a diagnosis including a suggested solution to the condition.

5. The system of claim 1 wherein the service provider computer receives at least the data and produces a diagnosis including a suggested root cause of the condition.

6. The system of claim 1 wherein the communication network comprises a control system connected to a local area network connected to a global computer network, wherein the host computer is connected to the local area network, the diagnostic system is connected to the control system, and the service provider computer is connected to the global computer network.

7. The rotating equipment monitoring device of claim 6, wherein the plurality of sensors includes an accelerometer.

8. The rotating equipment monitoring device of claim 1, wherein the communication interface is a 2-wire communication interface.

9. The rotating equipment monitoring device of claim 8, wherein the communication interface is a Fieldbus interface.

10. The rotating equipment monitoring device of claim 9, wherein the Fieldbus communication interface is one of a FOUNDATION Fieldbus, a Profibus, and a CAN protocol interface.

11. The rotating equipment monitoring device of claim 8, wherein the communication interface is a HART interface.

12. The rotating equipment monitoring device of claim 1, wherein the communication interface is a TCP/IP protocol interface.

13. The rotating equipment monitoring device of claim 1, wherein the communication interface is a 3-wire communication interface.

14. The rotating equipment monitoring device of claim 1, wherein the communication interface is a 4-wire communication interface.

15. The rotating equipment monitoring device of claim 1, wherein the processor includes a digital signal processor and an application processor.

16. The rotating equipment monitoring device of claim 1, wherein the diagnostic routine is adapted to detect a present operating condition of the rotating equipment based on the data from the plurality of sensors.

17. The rotating equipment monitoring device of claim 1, wherein the diagnostic routine is adapted to detect an expected future operating condition of the rotating equipment based on the data from the plurality of sensors.

18. The rotating equipment monitoring device of claim 1, wherein the diagnostic routine is adapted to detect an error condition associated with the rotating equipment.

19. The rotating equipment monitoring device of claim 1, wherein the diagnostic routine includes an expert engine.

20. The rotating equipment monitoring device of claim 19, wherein the expert engine is a rule-based engine.

21. The rotating equipment monitoring device of claim 1, wherein the communication interface automatically sends the first condition indication via the communication network.

22. The rotating equipment monitoring device of claim 1, wherein the diagnostic unit operates substantially continuously during operation of the rotating equipment.

23. The rotating equipment monitoring device of claim 1, wherein the sensors are adapted to be permanently mounted on or near the rotating equipment.

24. The rotating equipment monitoring device of claim 23, wherein the diagnostic unit is adapted to be permanently mounted on or near the rotating equipment.

25. The rotating equipment monitoring device of claim 1, wherein the diagnostic unit includes a local communication interface for connecting a local interface device to perform monitoring or configuration on the rotating equipment monitoring device.

26. A process plant comprising:

a communication network;

a host computer communicatively coupled to the communication network;

a plurality of field devices;

one or more controllers communicatively coupled to the plurality of field devices via the communication network to control the operation of the process plant using the plurality of field devices;

rotating equipment; and a monitoring device mounted on or near the rotating equipment including:

a plurality of sensors mounted on or near the rotating equipment to measure parameters associated with the rotating equipment during operation of the rotating equipment and to produce data indicative of the measured parameters; and a diagnostic unit communicatively coupled to receive the data from each of the plurality of sensors, the diagnostic unit including;

a processor;

a memory;

a diagnostic routine stored in the memory and adapted to be executed on the processor to perform diagnostics using the data collected from the plurality of sensors to produce a first condition indication indicating a condition of the rotating equipment; and a communication interface coupled to the communication network to send the first condition indication over the communication network; and, a service provider computer connected to the communication network for receiving the data, for processing the data to determine the condition of the rotating equipment to produce a second condition indication, and for communicating the second condition indication to the communication network; and the host computer connected to the communication network and receiving the first and second condition indications from the communication network and being responsive thereto to selectively produce commands for controlling the operation of the rotating equipment.

27. The process plant of claim 26, wherein the plurality of sensors includes two or more of a temperature sensor, a pressure sensor, a vibration sensor, and a rotational speed sensor.

28. The process plant of claim 26, wherein the communication interface is a 2-wire communication interface.

29. The process plant of claim 28, wherein the communication interface is a Fieldbus interface.

30. The process plant of claim 28, wherein the communication interface is a HART interface.

31. The process plant of claim 26, wherein the communication interface is a 3-wire communication interface.

32. The process plant of claim 26, wherein the communication interface is a 4-wire communication interface.

33. The process plant of claim 26, wherein the diagnostic routine includes an expert engine.

34. The process plant of claim 26, wherein the communication interface automatically sends the first condition indication via the communication network to the host computer.

35. The process plant of claim 26, wherein the communication interface automatically sends the first condition indication via the communication network to a display application within the host computer to be displayed to plant personnel.

36. The process plant of claim 26, wherein the communication interface automatically sends the first condition indication via the communication network to a maintenance application within the host computer.

37. The process plant of claim 26, wherein the communication interface automatically sends the first condition indication via the communication network to an optimization application within the host computer.

38. The process plant of claim 26, wherein the diagnostic unit operates substantially continuously during operation of the rotating equipment.

39. The process plant of claim 26, wherein the communication interface of the diagnostic unit can be browsed via the communication network.

* * * * *